(12) United States Patent
Kim

(10) Patent No.: US 12,447,892 B2
(45) Date of Patent: Oct. 21, 2025

(54) HEADLAMP AUTO-LEVELING CONTROL SYSTEM AND METHOD THEREOF

(71) Applicants: HYUNDAI MOTOR COMPANY, Seoul (KR); KIA CORPORATION, Seoul (KR)

(72) Inventor: Hyeong Seon Kim, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 58 days.

(21) Appl. No.: 18/516,096

(22) Filed: Nov. 21, 2023

(65) Prior Publication Data

US 2025/0026260 A1  Jan. 23, 2025

(30) Foreign Application Priority Data

Jul. 20, 2023 (KR) .................. 10-2023-0094723

(51) Int. Cl.
*B60Q 1/14* (2006.01)
*F21S 41/663* (2018.01)
*H04N 9/31* (2006.01)

(52) U.S. Cl.
CPC ............ *B60Q 1/143* (2013.01); *F21S 41/663* (2018.01); *H04N 9/3173* (2013.01); *H04N 9/3179* (2013.01); *B60Q 2300/054* (2013.01); *B60Q 2300/112* (2013.01); *B60Q 2300/14* (2013.01); *B60Q 2300/30* (2013.01); *B60Q 2300/40* (2013.01)

(58) Field of Classification Search
None
See application file for complete search history.

(56) References Cited

U.S. PATENT DOCUMENTS

2021/0001724 A1* 1/2021 Dobashi ................ B60K 35/81

FOREIGN PATENT DOCUMENTS

KR       101061215 B1       8/2011

* cited by examiner

*Primary Examiner* — Samira Monshi
(74) *Attorney, Agent, or Firm* — Lempia Summerfield Katz LLC

(57) ABSTRACT

A headlamp auto-leveling system and a method thereof are disclosed. The headlamp auto-leveling system and method adjust the radiation direction of light through a headlamp according to the state of a mobility device and the presence of physical objects in the front and rear sides of the mobility device, thereby reducing or minimizing the effect of a projection image on the surrounding mobility device and enhancing the accuracy of identification of messages through the projection image.

19 Claims, 10 Drawing Sheets

HEADLAMP AUTO-LEVELING CONTROL SYSTEM AND METHOD THEREOF

CROSS-REFERENCE TO RELATED APPLICATION

The present application claims priority to and the benefit of Korean Patent Application No. 10-2023-0094723, filed Jul. 20, 2023, the entire contents of which are incorporated herein by reference.

BACKGROUND

Technical Field

The present disclosure relates to a headlamp auto-leveling system and a method thereof, which adjust the radiation direction of light through a headlamp according to the state of a mobility device and the presence of physical objects in the front and rear sides of the mobility device.

Description of the Related Art

Generally, a mobility device (e.g., a vehicle) includes a lighting device for allowing a driver to see the objects in a driving direction when driving at night and notifying other vehicles or other road users of the driving state of the vehicle of the driver. A headlamp, also called as a headlight, is a lighting lamp that functions to illuminate roads ahead of a vehicle.

In other words, the headlamp radiates light in the driving direction when the mobility device drives so that other vehicles and obstacles on the road can be identified as visibility is secured in the forward path, and thus, safe driving is ensured.

Recently, for the convenience and driving safety of the vehicles and pedestrians on the opposite side, projection headlamps that prevent glare of the opposite vehicles and pedestrians by adjusting the aim of the headlamps or delivering messages using beam patterns on the road surface are applied.

However, conventional projection headlamps simply adjust the position of radiating the light toward the opposite vehicles and pedestrians detected on the front side of the vehicle. As a result, there is no means to avoid the glare of vehicles existing in various positions other than the direction facing the mobility device. In addition, as the purpose of using the projection headlamps is limited to preventing glare of vehicles on the opposite side, the use of the projection headlamps optimized for various situations is limited.

The above information disclosed in the Background section is only to improve understanding of the background of the present disclosure. Therefore, the information in the Background section should not be taken for granted in that they correspond to the prior art already known to those having ordinary skill in the art.

SUMMARY

An object of the present disclosure, proposed to solve the problems mentioned above, is to provide a headlamp auto-leveling system and a method thereof. The headlamp auto-leveling system and method thereof adjust the radiation direction of light through a headlamp according to the state of a mobility device (e.g., a vehicle) and the presence of physical objects in the front and rear sides of the mobility device.

In an embodiment of the present disclosure, a headlamp auto-leveling system includes a projection headlamp configured to form a projection image on the road surface by radiating light and adjust a position of the projection image. The system also includes an information collection unit for collecting object information around a mobility device. Additionally, the system includes a control unit configured to classify an object into a specific physical object based on the object information, and adjust aiming of the projection headlamp based on previously stored aiming adjustment data according to the classified physical object.

When the mobility device transitions from an engine-off state to an engine-off state and confirmation through the information collection unit that no physical object exists on a front side of the mobility device is complete, the control unit is configured to control the projection headlamp to adjust the aiming downward and radiate the projection image according to a welcome mode.

When the mobility device is switched to an engine-on state from an engine-off state and a physical object on a front side of the mobility device is identified as a wall based on an input through the information collection unit, the control unit is configured to control the projection headlamp to adjust the aiming upward and radiate the projection image according to a welcome mode based on the aiming adjustment data.

When the mobility device is switched to the engine-off state from the engine-on state, a door is opened, and a physical object on the front side of the mobility device is identified as a wall based on an input through the information collection unit, the control unit is configured to control the projection headlamp to adjust the aiming upward and radiate the projection image according to a goodbye mode based on the aiming adjustment data.

When the projection headlamp is controlled for a welcome mode or a goodbye mode, the control unit is configured to maintain aiming adjustment of the projection headlamp and radiation of the projection image for a set time period.

The control unit is further configured to store a reference aiming angle according to a reference speed range, and adjust an aiming angle upward when a driving speed is higher than the reference speed range. Furthermore, the upward adjustment of the aiming angle is increased gradually according to an acceleration range of the driving speed.

When a physical object on the front side of the mobility device is identified as another mobility device based on an input through the information collection unit while the mobility device is driving, the control unit is configured to grasp an interference range of the projection image with respect to another mobility device. The control unit is also configured to adjust a position of the projection image in an interference avoidance mode according to the interference range.

The control unit is further configured to perform the interference avoidance mode when the interference range of the projection image is larger than or equal to a preset range.

The control unit is further configured to perform the interference avoidance mode when a distance between the mobility device and a center position of the projection image is longer than a distance between the mobility device and another mobility device on the front side of the mobility device.

The control unit is further configured to adjust the aiming of the projection headlamp downward when the interference avoidance mode is performed.

When a physical object on a rear side of the mobility device input through the information collection unit while driving is identified as another mobility device, the control unit is configured to confirm a distance to another mobility device on the rear side of the mobility device. The control unit is further configured to adjust a brightness of the projection image using an interference prevention mode according to the distance to another mobility device.

When the interference prevention mode is performed, the control unit is configured to control the projection headlamp to adjust the brightness of the projection image to be lowered.

When the interference prevention mode is performed, the control unit is configured to increase a degree of brightness reduction as a distance to another mobility device on the rear side of the mobility device decreases.

In another embodiment, a headlamp auto-leveling method according to the present disclosure includes: an information collection step of collecting object information around a mobility device via an information collection unit; and a grasping step of classifying an object into a specific physical object based on the object information. The method also includes a control step of adjusting aiming of the projection headlamp based on previously stored aiming adjustment data according to the classified physical object.

When the mobility device is switched to an engine-on state from an engine-off state and confirmation through the information collection unit that no physical object exists on the front side of the mobility device is complete, the projection headlamp is controlled at the control step to adjust the aiming downward and radiate the projection image according to a welcome mode.

When the mobility device is switched to the engine-on state from the engine-off state and a physical object on the front side of the mobility device is identified as a wall based on an input at the information collection step, the projection headlamp is controlled at the control step to adjust the aiming upward and radiate the projection image according to a welcome mode based on the aiming adjustment data.

When the mobility device is switched to the engine-off state from the engine-on state, a door is opened, and a physical object on the front side of the mobility device is identified as a wall based on an input at the information collection step, the projection headlamp is controlled at the control step to adjust the aiming upward and radiate the projection image according to a goodbye mode based on the aiming adjustment data.

At the control step, a reference aiming angle according to a reference speed range is stored, and the aiming angle is adjusted downward when a driving speed is lower than the reference speed range. Furthermore, the aiming angle is adjusted upward when the driving speed is higher than the reference speed range.

When a physical object on the front side of the mobility device input at the information collection step is identified as another mobility device, at the control step, an interference range of the projection image with respect to another mobility device is grasped, and an interference avoidance mode of adjusting the aiming of the projection headlamp downward according to the interference range is performed.

When a physical object on a rear side of the mobility device input at the information collection step is identified as another mobility device, at the control step, a distance to another mobility device on the rear side of the mobility device is confirmed, and an interference prevention mode of reducing brightness of the projection image according to the distance to another mobility device is performed.

As the headlamp auto-leveling system and a method thereof, configured in the structure as described above, adjust the radiation direction of light through a headlamp according to the state of a mobility device and the presence of physical objects in the front and rear sides of the mobility device, the effect of a projection image on the surrounding mobilities is minimized. Furthermore, the identification of messages through the projection image is increased.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Figure 1:
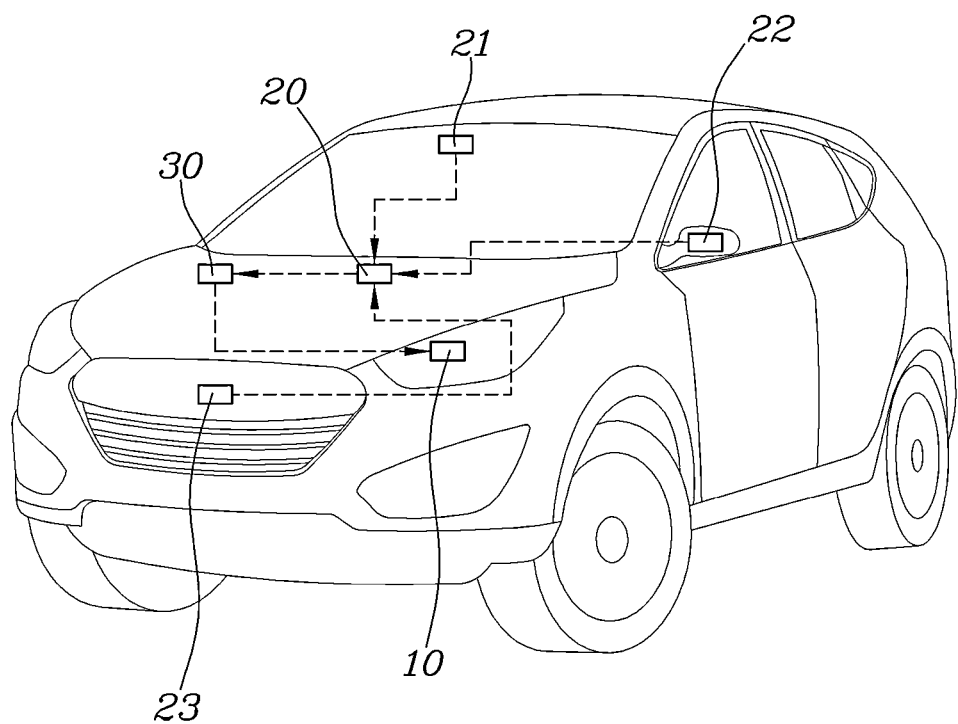
FIG. 1 is a view showing a configuration of a headlamp auto-leveling system according to an embodiment of the present disclosure.

Hereinafter, the embodiments disclosed in this specification are described in detail with reference to the accompanying drawings. The same reference numerals are given to the same or similar components regardless of reference symbols, and duplicate description thereof are omitted.

Suffixes "module" and "unit" used for the components in the following description are given or interchangeably used only for the purpose of writing the specification with ease, and do not have meanings or functions distinguished from each other by themselves.

In describing the embodiments disclosed in the specification, when it is determined that the detailed descriptions of related known techniques may obscure the gist of the embodiments disclosed in the specification, the detailed description is omitted. In addition, the accompanying drawings are only to enhance understanding of the embodiments disclosed in the specification. The technical spirit disclosed in the specification is not limited by the accompanying drawings, and should be understood to include all changes, equivalents, and substitutes included in the spirit and technical scope of the present disclosure.

Although terms including ordinal numbers such as first, second, and the like may be used to describe various components, the components are not limited by the terms. The terms are used only for the purpose of distinguishing one component from another.

When a component is mentioned as being "connected" or "coupled" to another component, it should be understood that although the component may be directly connected or coupled to another component, other components may exist in the middle. On the contrary, when a component is mentioned as being "directly connected" or "directly coupled" to another element, it should be understood that no other component exists in the middle.

Singular expressions include plural expressions unless the context clearly dictates otherwise.

In this specification, terms such as "comprise," "have," and the like are intended to indicate the presence of a feature, number, step, operation, component, part, or combination thereof described in the specification. It should also be understood that the terms do not preclude the possibility of the presence or addition of one or more other features, numbers, steps, operations, components, parts, or combinations thereof.

When a component, device, element, or the like of the present disclosure is described as having a purpose or performing an operation, function, or the like, the component, device, or element should be considered herein as being "configured to" meet that purpose or to perform that operation or function.

A control unit may include: a communication device that communicates with other control units or sensors to control the functions in charge; a memory that stores operating systems; logic commands; and input/output information. Additionally, the control unit may include one or more processors that perform determinations, calculations, decisions, and the like needed for controlling the functions in charge.

Hereinafter, a headlamp auto-leveling system and a method thereof according to an embodiment of the present disclosure is described with reference to the accompanying drawings.

As shown in FIG. 1, the headlamp auto-leveling system according to the present disclosure includes: a projection headlamp 10 configured to form a projection image A on the road surface by radiating light and adjusting a position of the projection image A. The headlamp auto-leveling system may also include an information collection unit 20 for collecting object information around a mobility device (e.g., a vehicle). Additionally, the headlamp auto-leveling system may include a control unit 30 configured to classify an object into a specific physical object based on the object information, and adjust an aiming of the projection headlamp 10 based on previously stored aiming adjustment data according to the classified physical object.

Figure 2:
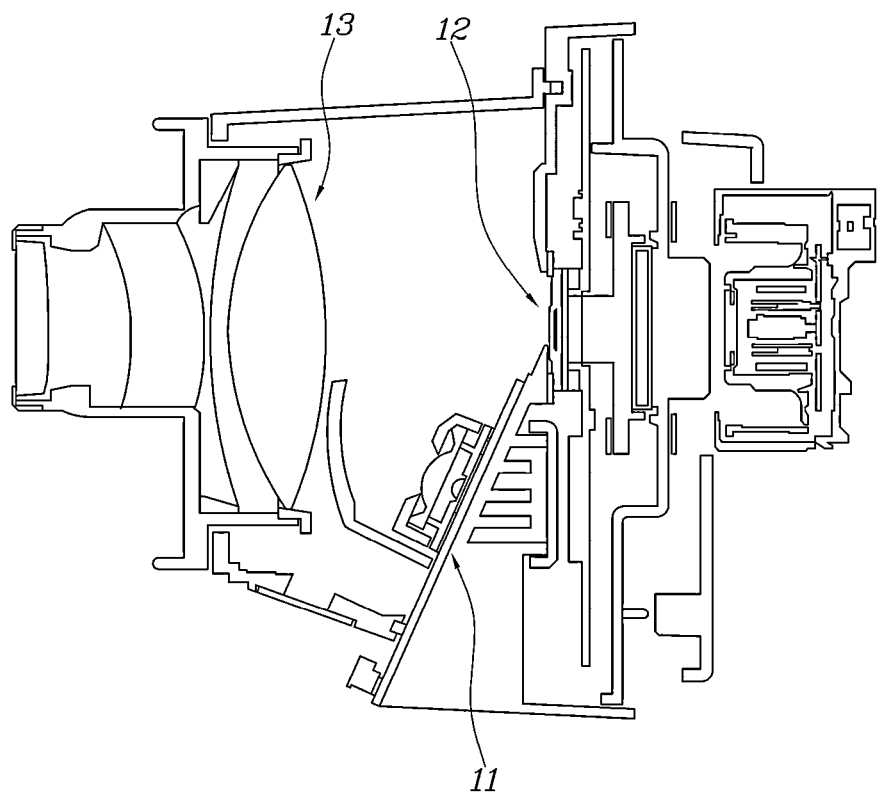
FIG. 2 is a view showing a projection headlamp according to an embodiment of the present disclosure.

The projection headlamp 10 is configured to radiate light on the road surface in the driving direction of the mobility device, and generate a low beam and a projection image A including a specific message. In addition, the projection headlamp 10 is configured to adjust the position of the projection image A. Accordingly, as shown in FIG. 2, the projection headlamp 10 may be configured with a light source 11, a digital micromirror device (DMD) 12, and an optical lens 13, as an embodiment. Furthermore, since the detailed configuration thereof is a known technology, a detailed description thereof is omitted.

The information collection unit 20 collects object information around the mobility device. The information collection unit 20 collects information on the objects such as other mobilities, obstacles, walls, pedestrians, and the like around the mobility device through various sensors provided in the mobility device, such as a camera sensor 21, a laser sensor 22, a LiDAR sensor 23, and the like.

The control unit 30 is configured to receive the information collected through the information collection unit 20 and adjust the aiming of the projection headlamp 10 based on corresponding information.

In other words, the control unit 30 classifies an object into a specific physical object based on the input object information, and adjusts aiming of the projection headlamp 10 based on previously stored aiming adjustment data according to the classified physical object. Accordingly, driving safety is secured as the projection image A radiated through the projection headlamp 10 minimizes interference with other mobilities or pedestrians. Additionally, a driver may easily identify the projection image A as the position of the projection image A is optimized according to the presence of a wall or positions of other mobilities.

Control of the control unit 30 in each situation according thereto may be implemented in various embodiments as described below.

Figure 3:
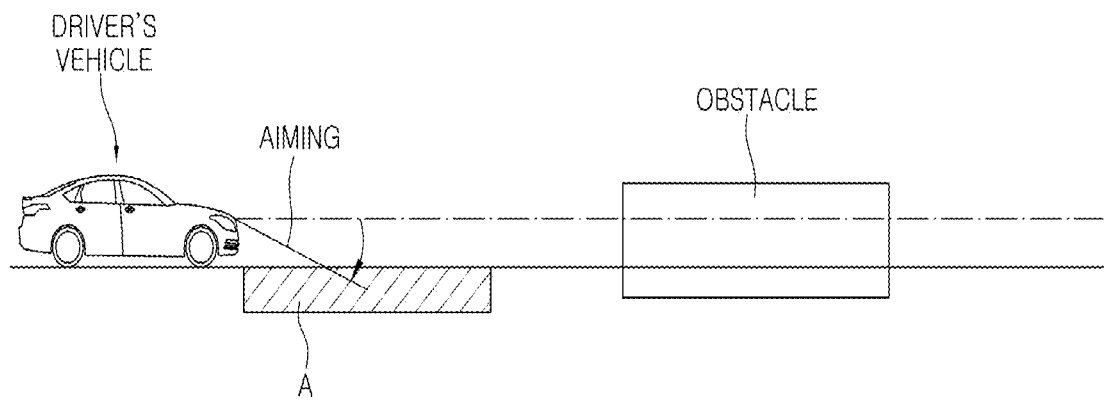
FIG. 3 is a view illustrating a welcome mode and a goodbye mode in a situation where no physical object exists.

As shown in FIG. 3, when the mobility device is switched to an engine-on state from an engine-off state and it is confirmed through the information collection unit 20 that no physical object exists on the front side of the mobility device, the control unit 30 controls the projection headlamp 10 to adjust the aiming downward and radiate the projection image A according to a welcome mode. Transitioning from an engine-off state to an engine-on state may be performed to activate the mobility device's power (e.g., to engage the power of the mobility device). Alternatively, transitioning from an engine-on state to an engine-off state may be performed to deactivate the mobility device's power (e.g., disable the power or turn off the power of the mobility device).

When the mobility device is turned to the engine-on state from the engine-off state, a welcome light condition is satisfied, and the control unit 30 radiates the projection image A according to the welcome mode through the projection headlamp 10.

Particularly, when it is confirmed through the information collection unit 20 that no physical object exists around the mobility device, the control unit 30 controls the projection headlamp 10 so that the projection image A is projected close to the mobility device.

In other words, since the position of the projection image A radiated through the projection headlamp 10 is set based on the driver's view from the driver's seat, the projection image A is projected at a distance of about 12 m from the mobility. However, the projection image A should be formed from the viewpoint of the mobility device in the welcome mode. When the projection image A is projected at a distance set by default, as the projection image A is radiated to other mobilities or the projection image is generated at a distance too far from the mobility device, it is difficult to recognize the projection image A according to the welcome mode.

Accordingly, when there is no obstacle on the front side under the condition of performing the welcome mode, the control unit 30 controls the projection headlamp 10 to adjust the aiming downward, so that identification of the projection image A can be improved. At this point, the projection headlamp 10 may be adjusted to aim downward by about 9.5°, and this may be changed to be optimized for the welcome mode.

Figure 4:
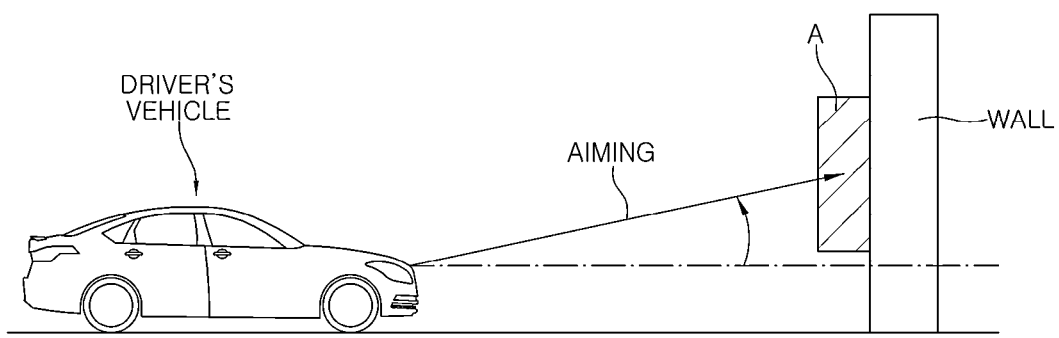
FIG. 4 is a view illustrating a welcome mode and a goodbye mode in a situation where a physical object is identified as a wall.

On the other hand, as shown in FIG. 4, when the mobility device is switched to the engine-on state from the engine-off state and the physical object on the front side is identified as a wall based on an input through the information collection unit 20, the control unit 30 may control the projection headlamp 10 to adjust the aiming upward and radiate the projection image A according to the welcome mode based on the aiming adjustment data.

When the mobility device is turned to the engine-on state from the engine-off state and the welcome light condition is satisfied, the control unit 30 radiates the projection image A according to the welcome mode through the projection headlamp 10.

Particularly, when it is confirmed, based on object information input through information collection, that the physical object on the front side of the mobility device is a wall, the control unit 30 adjusts the aiming of the projection headlamp 10 upward so that the projection image A is projected on the wall to improve identification.

When the projection headlamp 10 radiates the projection image A by default while a wall is in front of the mobility device, identification of the projection image A may be lowered as the projection image A is formed at a lower position of the wall.

Accordingly, when a physical object on the front side is identified as a wall under the condition of performing the welcome mode, the control unit 30 controls the projection headlamp 10 to adjust the aiming upward so that identification of the projection image A may be improved as the projection image A is generated at a higher position on the wall. At this point, the projection headlamp 10 may be controlled to adjust the aiming upward by about 2.4°, and this may be adjusted according to the distance between the mobility device and the wall.

On the other hand, when the mobility device is switched to the engine-off state from the engine-on state, the door is opened, and the physical object on the front side is identified as a wall based on an input through the information collection unit 20, the control unit 30 may control the projection headlamp 10 to adjust the aiming upward and radiate the projection image A according to a goodbye mode based on the aiming adjustment data.

When the mobility device is turned to the engine-off state from the engine-on state, a goodbye light condition is satisfied, and the control unit 30 controls the projection headlamp 10 to radiate the projection image A according to the goodbye mode.

When a physical object on the front side is identified as a wall under the condition of performing the goodbye mode, the control unit 30 controls the projection headlamp 10 to adjust the aiming upward so that identification of the projection image A may be improved as the projection image A is generated at a high position on the wall. At this point, the projection headlamp 10 may be controlled to adjust the aiming upward by about 2.4°, and this may be adjusted according to the distance between the mobility device and the wall.

When either the welcome mode or the goodbye mode described above is performed, the control unit 30 is configured to maintain the aiming adjustment of the projection headlamp 10 and radiation of the projection image A for a set time period. In other words, when the welcome mode or the goodbye mode is performed, the control unit 30 may control to generate a projection image for each of the modes, adjust aiming of the projection headlamp 10, reduce power consumption by maintaining a corresponding mode only for a set time period, and operate aiming of the headlamp normally in subsequent operations. The set time may be about 10 seconds, and this may be set variously or set to be changed in each mode.

Figure 5:
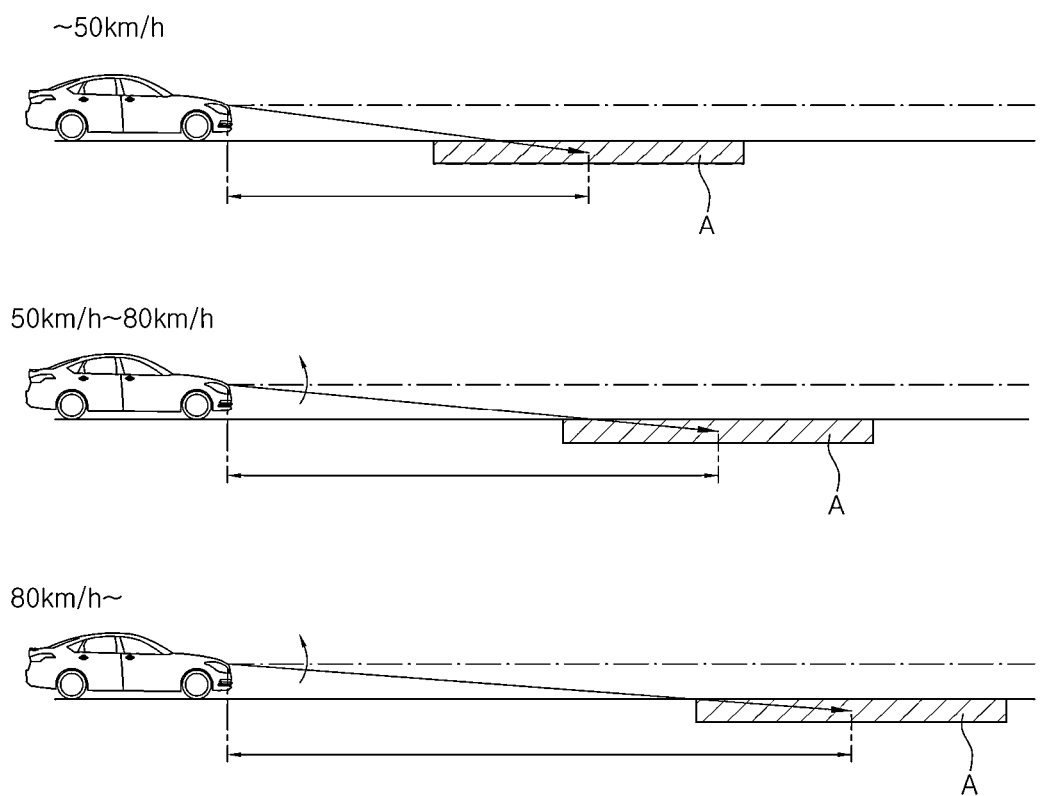
FIG. 5 is a view illustrating an aiming angle of projection headlamps according to a driving speed.

As shown in FIG. 5, the control unit 30 stores a reference aiming angle according to a reference speed range, and adjusts an aiming angle upward when a driving speed is higher than the reference speed range. Additionally, the upward adjustment of the aiming angle may be gradually increased according to an acceleration range of the driving speed.

The control unit 30 may adjust the aiming angle of the projection headlamp 10 according to the driving speed of the mobility device.

To this end, the control unit 30 stores a reference aiming angle according to a reference speed range. The reference speed range may be set to 50 km/h or less, and the reference aiming angle may be set to an angle at which the projection image A is generated at a point 12 m away from the mobility device.

The reference speed range, the generation distance of the projection image, the aiming angle, and the speed are examples according to the present disclosure, and each of the values may be adjusted according to design. Setting each numerical value in the description of the present disclosure is to enhance understanding of the present disclosure, and each numerical value may be adjusted to various setting values.

When the mobility device accelerates and goes beyond (e.g., out of) the reference speed range, the control unit 30 adjusts the aiming angle of the projection headlamp 10 upward so that identification of the projection image A projected on the road surface may be improved. In other words, since it is important to secure the front view as the driving speed of the mobility device increases, the projection image A is generated far from the mobility device by adjusting the aiming angle of the projection headlamp 10 upward in proportion to the increase in the driving speed. As a result, the front view can be secured easily together with the identification of the projection image A.

For example, the control unit 30 may set the reference speed range to 50 km/h or less, and adjust the aiming angle of the projection headlamp 10 upward by 0.5° in a speed range of 80 km/h when exceeding 50 km/h. The control unit 30 may further adjust the aiming angle of the projection headlamp 10 upward by 0.3° in a speed range exceeding 80 km/h.

On the other hand, when a physical object on the front side input through the information collection unit 20 while driving is identified as another mobility device, the control unit 30 may grasp an interference range of the projection image A with respect to another mobility device. The control unit 30 may also adjust the position of the projection image A in an interference avoidance mode according to the interference range.

The control unit 30 adjusts the aiming angle of the headlamp when there is another mobility device in front of the mobility device while driving.

In other words, when a physical object on the front side of the mobility device is identified as another mobility device based on the object information input through information collection while driving, the control unit 30 grasps whether the position of generating the projection image A according to the aiming of the current projection headlamp 10 interferes with the other mobility device. When the position of the projection image A is generated to include another mobility device located on the front side, glare may occur in the other mobility device on the front side. Thus, the position of the projection image A is adjusted to an interference avoidance mode to avoid glare.

The interference avoidance mode reduces the range of interference of the projection image A with other mobilities by adjusting the aiming of the projection headlamp 10. Additionally, the control unit 30 adjusts the aiming of the projection headlamp 10 according to the interference range of the projection image A with respect to other mobilities.

In other words, as the control unit 30 adjusts the aiming of the projection headlamp 10 downward when the interference avoidance mode is performed, the position of the projection image A is moved toward the mobility device side. As the aim of the projection headlamp 10 is adjusted downward and the position of the projection image A is moved closer to the driver side, the glare occurred by the projection image A on another mobility device on the front side is avoided. As a result, the driver may identify the projection image A projected on the road without being interfered with the other mobility device.

Figure 6:
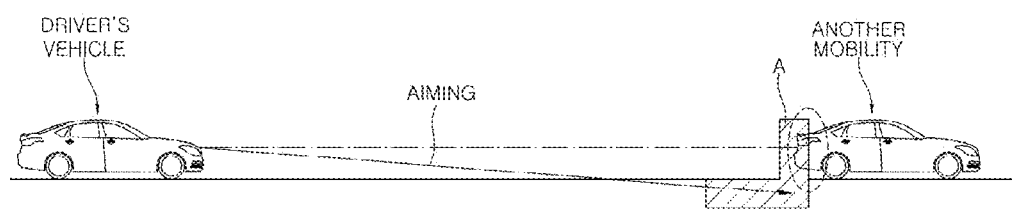
FIG. 6 is a view showing an embodiment according to a situation for determining whether or not to perform an interference avoidance mode.

As an embodiment of performing the interference avoidance mode, as shown in FIG. 6, the control unit 30 may perform the interference avoidance mode when the interference range of the projection image A is larger than or equal to a preset range.

The control unit 30 may identify the projection image A and another mobility device on the front side based on information input through the camera sensor 21. The control unit 30 may grasp the interference range of the projection image A by comparing the area of the projection image A with the outer area of another mobility device on the front side. The control unit 30 may store in advance a setting range for grasping whether the projection image A generates glare to other mobilities, and the setting range may be set to 50% of the area of the mobility device.

Through this, the control unit 30 performs the interference avoidance mode of adjusting the aiming of the projection headlamp 10 downward when the interference range of the projection image A is larger than the set range.

Figure 7:
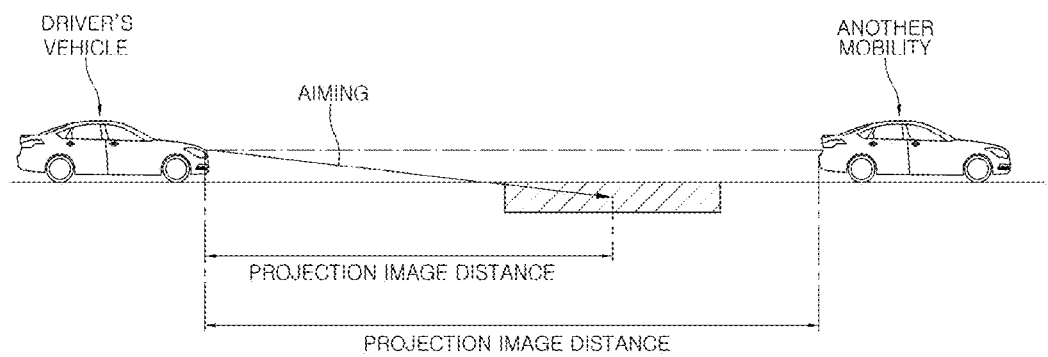
FIG. 7 is a view showing another embodiment according to a situation for determining whether or not to perform an interference avoidance mode.

As another embodiment, as shown in FIG. 7, the control unit 30 may perform the interference avoidance mode when the distance between the mobility device and the center position of the projection image A is longer than the distance between the mobility device and another mobility device on the front side.

The control unit 30 may confirm the center position of the projection image A and the distance information according to the position of another mobility device on the front side based on information input through the laser sensor 22 or the camera sensor 21. The control unit 30 may determine whether or not to perform the interference avoidance mode by comparing the distance between the mobility device and the center position of the projection image A and the distance between the mobility device and another mobility device located on the front side of the mobility device.

For example, when the distance between the mobility device and the center position of the projection image A is larger than the distance between the mobility device and another mobility device on the front side, the control unit 30 may determine that the radiation position of the projection image A includes another mobility device. Accordingly, as the control unit 30 performs the interference avoidance mode of adjusting the aiming of the projection headlamp 10 downward, the projection image A is avoided from another mobility device on the front side, and the driver may identify the projection image A.

Figure 8:
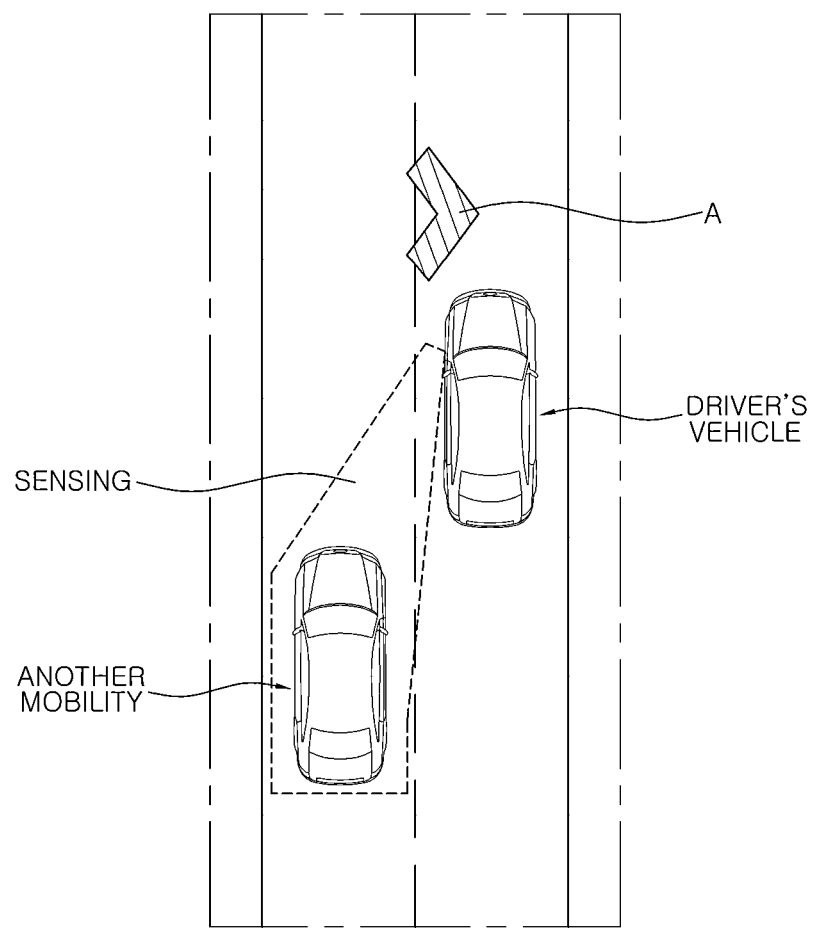
FIG. 8 is a view illustrating the control of projection headlamps in a situation where a physical object on the rear side is identified as another mobility device.

On the other hand, as shown in FIG. 8, when a physical object on the rear side input through the information collection unit 20 while driving is identified as another mobility device, the control unit 30 may confirm the distance to the mobility device on the rear side. The control unit 30 may also adjust the brightness of the projection image A using an interference prevention mode according to the distance to another mobility device.

The control unit 30 adjusts the brightness of the projection image A when there is another mobility device on the rear side of the mobility device while driving. This is to prevent driving accidents generated as the driver of another mobility device on the rear side misrecognizes the projection image A as information transmitted to him or her.

In other words, when a physical object on the rear side of the mobility device is identified as another mobility device based on the object information input through information collection while the mobility device is in a driving state, the control unit 30 grasps whether the projection image A radiated from the projection headlamp 10 interferes with another mobility device. When there is another mobility device on the rear side of the mobility device, the brightness of the projection image A is lowered so that the driver riding in another mobility device on the rear side may not recognize the projection image A.

The interference prevention mode is to reduce the brightness of the projection image A generated through the projection headlamp 10, and the control unit 30 may control the projection headlamp 10 to adjust the brightness of the projection image A to be lowered. In addition, when the interference prevention mode is performed, the control unit 30 may increase the degree of brightness reduction as the distance to another mobility device on the rear side decreases. Adjusting the brightness of the projection image A may be implemented by reducing the consumption of power applied to the projection headlamp 10. Furthermore, as the control unit 30 adjusts the degree of brightness reduction according to the distance to another mobility device on the rear side, the driver of the vehicle may recognize the projection image A. As a result, the driver of another mobility device on the rear side may not recognize the projection image A.

As the brightness of the projection image A radiated from the projection headlamp 10 is lowered, the transfer of incorrect information due to recognition of the projection image A by a driver in another mobility device on the rear side is prevented, and only the driver in the vehicle may identify the projection image A generated through the projection headlamp 10.

Figure 9:
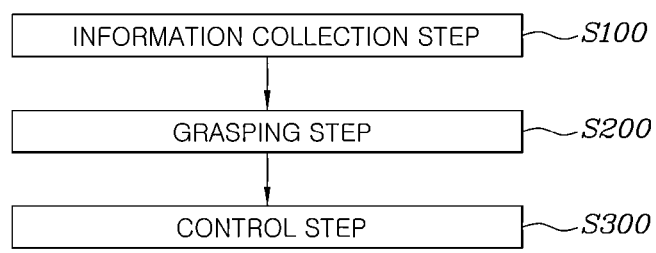
FIG. 9 is a flowchart illustrating a headlamp auto-leveling method according to an embodiment of the present disclosure.

As shown in FIG. 9, the headlamp auto-leveling method according to the present disclosure includes an information collection step of collecting object information around a mobility device (S100). The method also includes a grasping step of classifying an object into a specific physical object based on the object information (S200). Additionally, the method includes a control step of adjusting the aiming of the projection headlamp 10 based on previously stored aiming adjustment data according to the classified physical object (S300).

Accordingly, in the present disclosure, driving safety is secured as the projection image A radiated through the projection headlamp 10) minimizes interference with other mobilities or pedestrians. A driver may easily identify the projection image A as the position of the projection image A is optimized according to the presence of a wall or positions of other mobilities.

When the mobility device is switched to the engine-on state from the engine-off state and it is confirmed through the information collection unit 20 that no physical object exists on the front side of the mobility device, the projection headlamp 10 may be controlled at the control step (S300) to adjust the aiming downward and radiate a projection image A according to a welcome mode.

When there is no obstacle on the front side under the condition of performing the welcome mode, the projection headlamp 10 is controlled to adjust the aiming downward, so that identification of the projection image A can be improved. The same control may be performed when there is no obstacle on the front side even under the condition of performing the goodbye mode.

On the other hand, when the mobility device is switched to the engine-on state from the engine-off state and the physical object on the front side input at the information collection step (S100) is identified as a wall, the projection headlamp 10 may be controlled at the control step (S300) to adjust the aiming upward and radiate the projection image A according to the welcome mode based on the aiming adjustment data.

In addition, when the mobility device is switched to the engine-off state from the engine-on state, the door is opened, and the physical object on the front side is identified as a wall based on an input at the information collection step (S100), the projection headlamp 10 may be controlled at the control step (S300) to adjust the aiming upward and radiate the projection image A according to the goodbye mode based on the aiming adjustment data.

When it is confirmed that the physical object on the front side of the mobility device is a wall based on object information input through the grasping step (S200), the aiming of the projection headlamp 10 is adjusted upward at the control step (S300) so that the projection image A is projected on the wall to improve identification.

At the control step (S300), a reference aiming angle according to a reference speed range is stored, and the aiming angle may be adjusted downward when the driving speed is lower than the reference speed range. Additionally, the aiming angle may be adjusted upward when the driving speed is higher than the reference speed range.

In other words, since it is important to secure the front view as the driving speed of the mobility device increases, the projection image A is generated far from the mobility device by adjusting the aiming angle of the projection headlamp 10 upward in proportion to an increase of the driving speed. Thus the front view can be secured easily, together with the identification of the projection image A.

On the other hand, when a physical object on the front side input at the information collection step (S100) is identified as another mobility device, at the control step (S300), the interference range of the projection image A with respect to another mobility device may be grasped. In response, an interference avoidance mode of adjusting the aiming of the projection headlamp 10 downward according to the interference range may be performed.

In other words, when a physical object on the front side is identified as another mobility device while the mobility device is in a driving state, it is grasped whether the position of generating the projection image A according to the aiming of the current projection headlamp 10 interferes with the other mobility device. Furthermore, when the position of the projection image A is generated to include another mobility device on the front side, glare may occur in the other mobility device on the front side, and the position of the projection image A is adjusted to an interference avoidance mode to avoid the glare.

As the projection headlamp 10 is controlled to adjust the aiming downward when the interference avoidance mode is performed, the position of the projection image A is moved to the mobility device side. As the aiming of the projection headlamp 10 is adjusted downward and the position of the projection image A is moved closer to the driver side, the glare occurred by the projection image A on another mobility device on the front side is avoided. As a result, the driver may identify the projection image A projected on the road without being interfered with another mobility device.

On the other hand, when a physical object on the rear side input at the information collection step (S100) is identified as another mobility device, at the control step (S300), the distance to another mobility device on the rear side may be confirmed. As a result, an interference prevention mode of reducing the brightness of the projection image A according to the distance to another mobility device may be performed.

In other words, in the present disclosure, when a physical object on the rear side of the mobility device is identified as another mobility device while the mobility device is in a driving state, it is grasped whether the projection image A radiated from the projection headlamp 10 interferes with another mobility device. Thus, the brightness of the projection image A is lowered so that the driver riding in another mobility device on the rear side may not recognize the projection image A.

As the brightness of the projection image A radiated from the projection headlamp 10 is lowered, the transfer of incorrect information due to recognition of the projection image A by a driver in another mobility device on the rear side is prevented. Therefore, only the driver in the vehicle may identify the projection image A generated through the projection headlamp 10.

Figure 10:
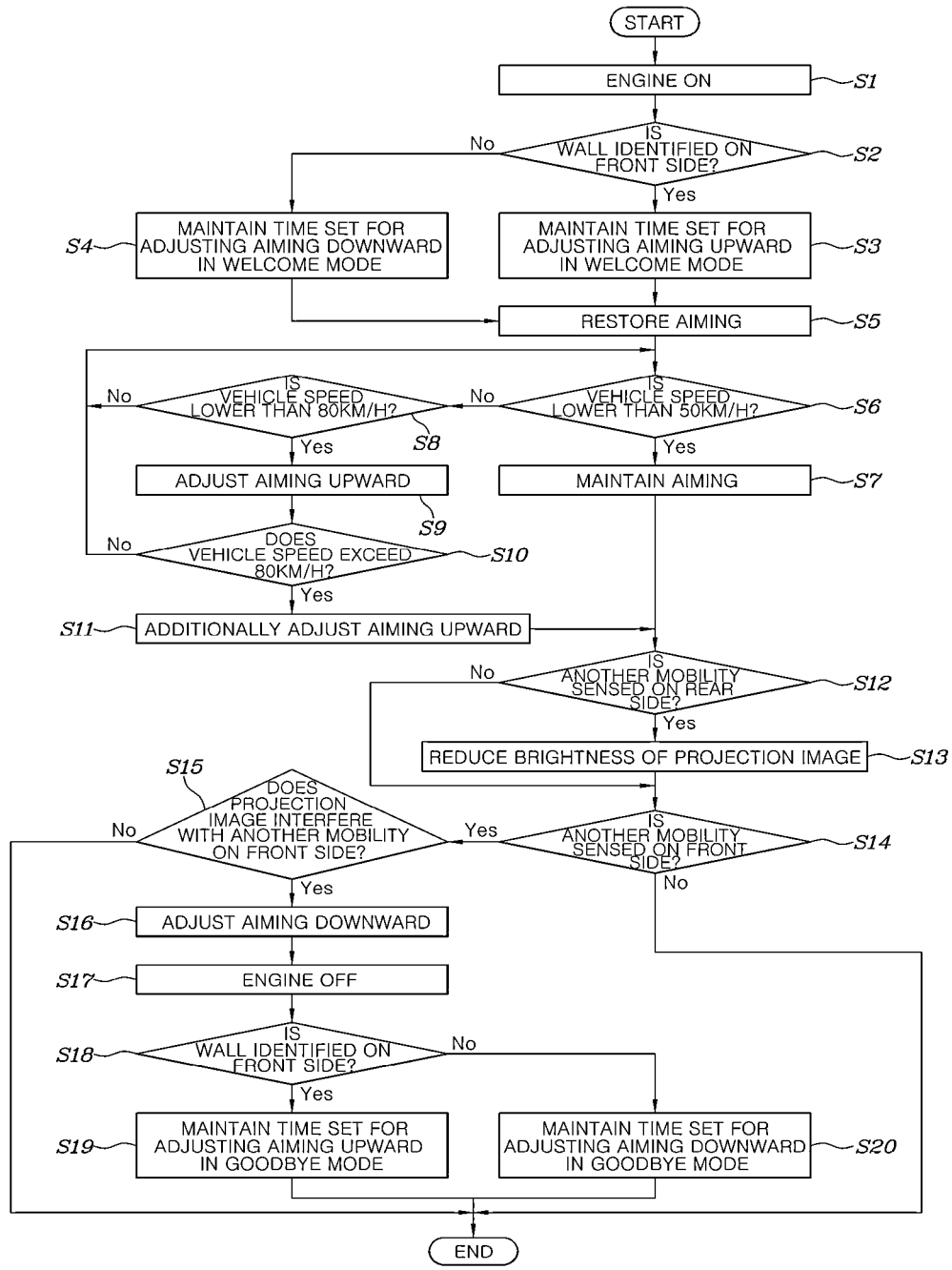
FIG. 10 is a detailed flowchart illustrating the headlamp auto-leveling method shown in FIG. 9.

The headlamp auto-leveling method described above may be controlled according to steps S1 to S20 in the flowchart of FIG. 10.

As the headlamp auto-leveling system and a method thereof configured in the structure as described above adjust the radiation direction of light through a headlamp according to the state of a mobility device and the presence of physical objects in the front and rear sides, the effect of a projection image A on the surrounding mobilities is minimized. Additionally identification of messages through the projection image A is increased.

Although the present disclosure has been shown and described in relation to specific embodiments, it should be apparent to those having ordinary skill in the art that the present disclosure can be variously improved and modified without departing from the technical spirit of the present disclosure provided by the claims below.

What is claimed is:

1. A headlamp auto-leveling system comprising:
   a projection headlamp configured to form a projection image on a road surface by radiating light and adjusting a position of the projection image;
   an information collection unit configured to collect object information around a mobility device; and
   a control unit configured to classify an object into a specific physical object based on the object information, and adjust aiming of the projection headlamp based on previously stored aiming adjustment data according to the classified physical object,
   wherein when the projection headlamp is controlled for a welcome mode or a goodbye mode, the control unit is configured to maintain aiming adjustment of the projection headlamp and radiation of the projection image for a set time period.

2. The headlamp auto-leveling system according to claim 1, wherein when the mobility device is switched to an engine-on state from an engine-off state and no physical object on a front side of the mobility device is confirmed through the information collection unit, the control unit is configured to control the projection headlamp to adjust the aiming downward and radiate the projection image according to the welcome mode.

3. The headlamp auto-leveling system according to claim 1, wherein when the mobility device is switched to an engine-on state from an engine-off state and a physical object on a front side of the mobility device is identified as a wall based on an input through the information collection unit, the control unit is configured to control the projection headlamp to adjust the aiming upward and radiate the projection image according to the welcome mode based on the aiming adjustment data.

4. The headlamp auto-leveling system according to claim 1, wherein when the mobility device is switched to an engine-off state from an engine-on state, a door is opened, and a physical object on a front side of the mobility device is identified as a wall based on an input through the information collection unit, the control unit is configured to control the projection headlamp to adjust the aiming upward and radiate the projection image according to the goodbye mode based on the aiming adjustment data.

5. The headlamp auto-leveling system according to claim 1, wherein the control unit is further configured to store a reference aiming angle according to a reference speed range, and adjust an aiming angle upward when a driving speed is higher than the reference speed range, and wherein the upward adjustment of the aiming angle is increased gradually according to an acceleration range of the driving speed.

6. The headlamp auto-leveling system according to claim 1, wherein when a physical object on a front side of the mobility device input through the information collection unit while driving is identified as another mobility device, the control unit is configured to grasp an interference range of the projection image with respect to another mobility device, and adjust a position of the projection image in an interference avoidance mode according to the interference range.

7. The headlamp auto-leveling system according to claim 6, wherein the control unit is further configured to perform the interference avoidance mode when the interference range of the projection image is larger than or equal to a preset range.

8. The headlamp auto-leveling system according to claim 6, wherein the control unit is further configured to perform the interference avoidance mode when a distance between the mobility device and a center position of the projection image is longer than a distance between the mobility device and another mobility device on the front side of the mobility device.

9. The headlamp auto-leveling system according to claim 6, wherein the control unit is further configured to adjust the aiming of the projection headlamp downward when the interference avoidance mode is performed.

10. The headlamp auto-leveling system according to claim 1, wherein when a physical object on a rear side of the mobility device is identified as another mobility device based on an input through the information collection unit while the mobility device is driving, the control unit is configured to confirm a distance to the another mobility device on the rear side of the mobility device, and adjust a brightness of the projection image using an interference prevention mode according to the distance to the another mobility device.

11. The headlamp auto-leveling system according to claim 10, wherein when the interference prevention mode is performed, the control unit is configured to control the projection headlamp to adjust the brightness of the projection image to be lowered.

12. The headlamp auto-leveling system according to claim 11, wherein when the interference prevention mode is performed, the control unit is configured to increase a degree of brightness reduction as a distance to another mobility device on the rear side of the mobility device decreases.

13. A headlamp auto-leveling method comprising:
an information collection step of collecting object information around a mobility device via an information collection unit;
a grasping step of classifying an object into a specific physical object based on the object information; and
a control step of adjusting aiming of a projection headlamp based on previously stored aiming adjustment data according to the classified physical object,
wherein the control step includes maintaining aiming adjustment of the projection headlamp and radiation of a projection image for a set time period during control of the projection headlamp for a welcome mode or a goodbye mode.

14. The headlamp auto-leveling method according to claim 13, wherein when the mobility device is switched to an engine-on state from an engine-off state and no physical object on a front side of the mobility device is confirmed by the information collection unit, the projection headlamp is controlled at the control step to adjust the aiming downward and radiate the projection image according to the welcome mode.

15. The headlamp auto-leveling method according to claim 14, wherein when the mobility device is switched to the engine-on state from the engine-off state and a physical object on the front side of the mobility device is identified as a wall based on an input at the information collection step, the projection headlamp is controlled at the control step to adjust the aiming upward and radiate the projection image according to the welcome mode based on the aiming adjustment data.

16. The headlamp auto-leveling method according to claim 14, wherein when the mobility device is switched to the engine-off state from the engine-on state, a door is opened, and a physical object on the front side of the mobility device is identified as a wall based on an input at the information collection step, the projection headlamp is controlled at the control step to adjust the aiming upward and radiate the projection image according to the goodbye mode based on the aiming adjustment data.

17. The headlamp auto-leveling method according to claim 14, wherein at the control step, a reference aiming angle according to a reference speed range is stored, and the aiming angle is adjusted downward when a driving speed is lower than the reference speed range, and the aiming angle is adjusted upward when the driving speed is higher than the reference speed range.

18. The headlamp auto-leveling method according to claim 14, wherein when a physical object on the front side of the mobility device is identified as another mobility device based on an input at the information collection step, an interference range of the projection image with respect to the another mobility device is grasped, and an interference avoidance mode of adjusting the aiming of the projection headlamp downward according to the interference range is performed at the control step.

19. The headlamp auto-leveling method according to claim 14, wherein when a physical object on a rear side of the mobility device is identified as another mobility device based on an input at the information collection step, at the control step, a distance to the another mobility device on the rear side of the mobility device is confirmed, and an interference prevention mode of reducing brightness of the projection image according to the distance to the another mobility device is performed.

* * * * *